United States Patent
Bond et al.

(10) Patent No.: US 8,573,866 B2
(45) Date of Patent: Nov. 5, 2013

(54) HEAD-MOUNTED FACE IMAGE CAPTURING DEVICES AND SYSTEMS

(75) Inventors: Jason R. Bond, Middleton, WI (US);
David W. Staple, Madison, WI (US);
Michelle Bond, Middleton, WI (US)

(73) Assignee: Jason R. Bond, Middleton, WI (US)

( * ) Notice: Subject to any disclaimer, the term of this patent is extended or adjusted under 35 U.S.C. 154(b) by 91 days.

(21) Appl. No.: 13/365,524

(22) Filed: Feb. 3, 2012

(65) Prior Publication Data

US 2012/0263449 A1     Oct. 18, 2012

Related U.S. Application Data

(60) Provisional application No. 61/439,177, filed on Feb. 3, 2011.

(51) Int. Cl.
*H04N 7/14* (2006.01)
*H04N 7/18* (2006.01)

(52) U.S. Cl.
USPC ............ 396/420; 396/429; 396/51; 396/351; 348/77

(58) Field of Classification Search
USPC .......................................... 396/420
See application file for complete search history.

(56) References Cited

U.S. PATENT DOCUMENTS

| | | | | |
|---|---|---|---|---|
| 3,542,457 A | * | 11/1970 | Ziegler et al. | 351/206 |
| 4,852,988 A | * | 8/1989 | Velez et al. | 351/210 |
| 5,886,735 A | * | 3/1999 | Bullister | 348/14.16 |
| 6,211,903 B1 | * | 4/2001 | Bullister | 348/14.16 |
| 6,373,961 B1 | * | 4/2002 | Richardson et al. | 382/103 |
| 6,637,883 B1 | | 10/2003 | Tengshe et al. | |
| 6,997,556 B2 | * | 2/2006 | Pfleger | 351/246 |
| 7,365,766 B1 | * | 4/2008 | Lapalme | 348/61 |
| RE41,471 E | * | 8/2010 | Wood, Jr. | 370/346 |
| 8,289,443 B2 | * | 10/2012 | Mackenzie | 348/376 |
| 2005/0083248 A1 | * | 4/2005 | Biocca et al. | 345/8 |
| 2005/0180687 A1 | | 8/2005 | Amitai | |
| 2007/0164990 A1 | | 7/2007 | Bjorklund et al. | |
| 2009/0125849 A1 | | 5/2009 | Bouvin et al. | |

(Continued)

FOREIGN PATENT DOCUMENTS

JP     08065647 A  *  3/1996

OTHER PUBLICATIONS

Biwasaka et al. "Application of computerised correction method for optical distortion of two-dimensional facial image in superimposition between three-dimensional and two-dimensional facial images," Forensic Science International, 197(1): 97-104, 2010.

(Continued)

*Primary Examiner* — Clayton E Laballe
*Assistant Examiner* — Leon W Rhodes, Jr.
(74) *Attorney, Agent, or Firm* — Casimir Jones, S.C.

(57) ABSTRACT

The present invention provides head-mounted systems and devices for capturing an image of a user's face. In particular, the present invention provides systems and devices comprising: a) a head-mounted frame component configured to be mounted on the head of a user (e.g., hat, head band, glasses, goggles, etc.) and b) an extending component that is moveable between a first position in or adjacent to the head-mounted frame component and a second position non-adjacent to the head-mounted frame component that allows a camera (or mirror) on the extending component to capture an image (e.g., picture or video) of the user's face.

18 Claims, 4 Drawing Sheets

(56) References Cited

U.S. PATENT DOCUMENTS

2010/0045928 A1    2/2010  Levy
2010/0123776 A1*   5/2010  Wydeven et al. .............. 348/77
2010/0202048 A1    8/2010  Amitai et al.

OTHER PUBLICATIONS

Biwasaka et al. "Assessment of Computerized Method for Correction of Optical Distortion of Facial Images," Japanese Journal of Forensic Science and Technology, 13(1): 7-16, 2008.

Duchowski, Andrew T. "Eye Tracking Methodology: Theory and Practice," Springer-Verlag New York, Inc. Secaucus, NJ, USA, 2003.

Krolak and Strumillo, "Eye-blink Controlled Human-Computer Interface for the Disabled," Human-Computer Sys. Intera., AISC 60, p. 123-133, 2009.

Trispecs Press Document, as retrieved from http://www.trispecs.com/#/news on Nov. 29, 2010.

* cited by examiner

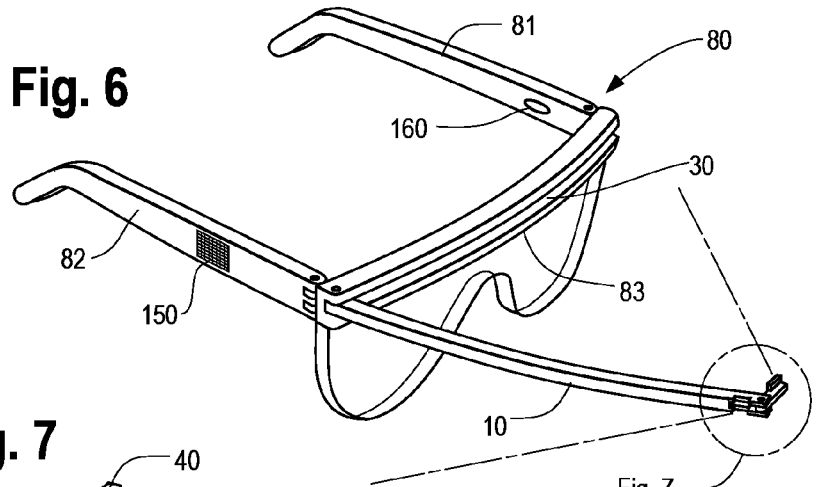
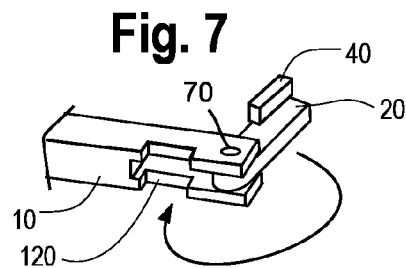
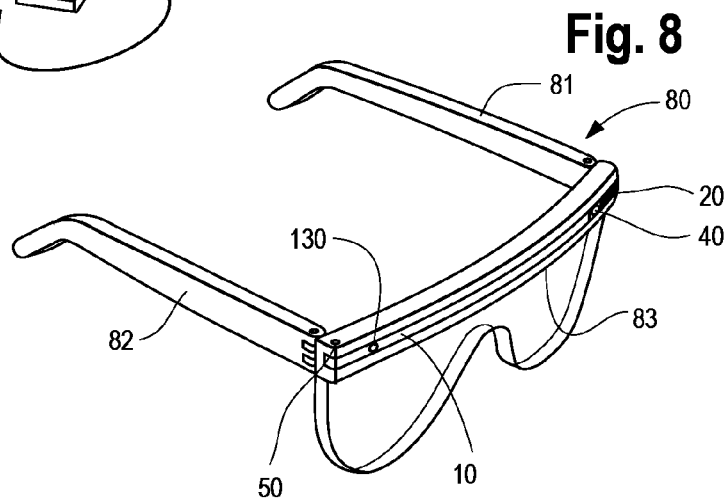
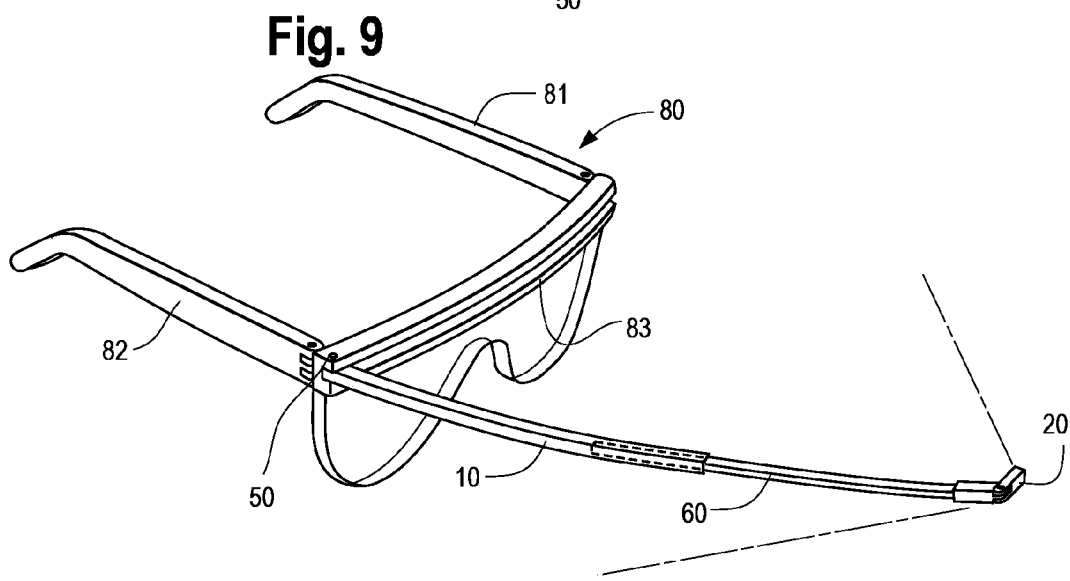

HEAD-MOUNTED FACE IMAGE CAPTURING DEVICES AND SYSTEMS

CROSS-REFERENCE TO RELATED APPLICATIONS

The present invention claims the priority of U.S. Provisional Patent Application Ser. No. 61/439,177, filed Feb. 3, 2011, which is incorporated by reference in its entirety.

FIELD OF THE INVENTION

The present invention provides head-mounted systems and devices for capturing an image of a user's face. In particular, the present invention provides systems and devices comprising: a) a head-mounted frame component configured to be mounted on the head of a user (e.g., hat, head band, glasses, goggles, etc.) and b) an extending component that is moveable between a first position in or adjacent to the head-mounted frame component and a second position non-adjacent to the head-mounted frame component that allows a camera (or mirror) on the extending component to capture an image (e.g., picture or video) of the user's face.

BACKGROUND

Video conferencing is becoming an important way for people and businesses to communicate. However, challenges to mobile video conferencing remain, for example, many devices require the user to hold their phone in front of their face to capture an image of their face. What is needed are devices and systems that allow hands-free mobile video conferencing.

SUMMARY OF THE INVENTION

The present invention provides head-mounted systems and devices for capturing an image of a user's face. In particular, the present invention provides systems and devices comprising: a) a head-mounted frame component configured to be mounted on, or attached to, the head of a user (e.g., hat, head band, glasses, goggles, etc.) and b) an extending component that is moveable between a first position in or adjacent to the head-mounted frame component and a second position non-adjacent to the head-mounted frame component that allows a camera (or mirror reflecting to a camera mounted on the frame component) on the extending component to capture an image (e.g., picture or video) of the user's face.

In certain embodiments, the present invention provides head-mounted systems and devices for capturing an image of a user's face. In particular, the present invention provides systems and devices comprising: a) a head-mounted frame component configured to be mounted on, or attached to, the head of a user (e.g., hat, head band, glasses, goggles, etc.), and b) an extending component that is moveable between a first position in which a distal end of said extending component is adjacent to the head-mounted frame component and a second position in which the distal end is non-adjacent to the head-mounted frame component, wherein a camera is mounted on said head-mounted frame component and is directed toward the distal end of the extending component when in the non-adjacent position, wherein the distal end of the extending component comprises an optical element (e.g., lens, mirror, etc.) that reflects and/or redirects light thereby allowing the camera on the head-mounted frame component to capture an image (e.g., picture or video) of the user's face.

In some embodiments, systems and devices are provided comprising: a) a head-mounted frame component configured to be mounted on, or attached to, the head of a user (e.g., glasses, goggles, etc.) and b) an extending component that is moveable between a first position in or adjacent to the head-mounted frame component and a second position non-adjacent to the head-mounted frame component that allows a camera on the extending component to capture an image (e.g., picture or video) of the user's face.

In some embodiments, systems and devices are provided comprising: a) a head-mounted frame component configured to be mounted on, or attached to, the head of a user (e.g., hat, head band, glasses, goggles, etc.), wherein the head-mounted frame component comprises a camera and b) an extending component that is moveable between a first position in or adjacent to the head-mounted frame component and a second position non-adjacent to the head-mounted frame component, wherein the extending component comprises an optical element (e.g., mirror or lens) that allows a camera on the head-mounted frame component directed toward the optical element in the position non-adjacent to the head-mounted frame component to capture an image (e.g., picture or video) of the user's face.

In certain embodiments, the present invention provides systems and devices for capturing an image of a user's face comprising: a) a head-mounted frame component configured to be attached to, or mounted on, the head of a user; and b) an extending component connected to the head-mounted frame component, wherein the extending component comprises; i) a main rod, ii) a housing component attached to the main rod, iii) a camera located in or attached to the housing component; wherein the extending component is moveable between a first position in or adjacent to the head-mounted frame component, and a second position non-adjacent to the head-mounted frame component, wherein the second position allows the camera to capture an image of the user's face when the head-mounted frame component is attached to the head of the user.

In other embodiments, the present invention provides systems and devices for capturing an image of a user's face comprising: a) a head-mounted frame component configured to be attached to, or mounted on, the head of a user, wherein the head-mounted frame component comprises a camera; and b) an extending component connected to the head-mounted frame component, wherein the extending component comprises; i) a main rod, ii) a housing component attached to the main rod, iii) a optical element (e.g. mirror, lens, etc.) located in or attached to the housing component; wherein the extending component is moveable between a first position in or adjacent to the head-mounted frame component, and a second position non-adjacent to the head-mounted frame component, wherein the second position allows the camera to capture an image of the user's face via reflection or redirection of the image off the optical elements, when the head-mounted frame component is attached to the head of the user.

In other embodiments, the systems and devices further comprise a housing component hinge, wherein the housing component is attached to the main rod via the housing component hinge. In certain embodiments, the main rod comprises a camera casing recess configured to allow the housing component and camera to pivot therein via the housing component hinge. In some embodiments, in the first position, the camera points outward from the head-mounted frame component and can capture what the user is seeing, and wherein in the second position, the camera can capture an image of the user's face.

In particular embodiments, the systems and devices further comprise at least one lens (e.g., 1, 2, or more), wherein the at least one lens is attached to the head-mounted frame component, and is configured to at least partially cover the user's eye when the device is mounted on the user's head. In some embodiments, the system or devices further comprise a projection device (e.g., a Light-guide Optical Element (LOE) from LUMUS or similar device) configured to project an image onto or into the at least one lens such that it can be seen by the user.

In some embodiments, the second position places the camera at least 4 inches away from the user's face (e.g., 4 inches, 4.5 inches, 5 inches, 5.5 inches, 6 inches, 6.5 inches, 7 inches, or more). In other embodiments, the extending component is hingedly connected to the head-mounted frame component. In other embodiments, the head-mounted frame component comprises a left frame arm and a right frame arm. In some embodiments, the first position is within the right frame arm (e.g., as shown in FIG. 11). In particular embodiments, the left or the right frame arm comprises a frame arm compartment (e.g., for batteries, CPU, electronics, etc.). In some embodiments, the left or the right frame arm comprises a speaker configured to direct sound to the user's ear.

In certain embodiments, the systems and devices further comprise a light and/or microphone located on the main rod adjacent to the camera. In other embodiments, the camera comprises a wide-angle lens. In particular embodiments, the camera comprises a web-cam. In additional embodiments, the head-mounted frame component comprises a main rod frame recess. In particular embodiments, the first position is within the main rod frame recess. In other embodiments, the systems and devices further comprise a telescoping internal rod that is configured to extend from within the main rod. In other embodiments, the systems and devices further comprise at least one eye tracking device configured to track eye movement and/or blinks. In further embodiments, the at least one eye tracking device is an infrared eye tracking device.

In some embodiments, the systems and devices further comprise a communication element. In some embodiments, a communication element is configured to wirelessly transmit images of said user (and/or other data), and/or receive data from an outside source. In some embodiments, a communication element is mounted on or within the head-mounted frame. In some embodiments, a communication element is configured to transmit and/or receive information (e.g., to a satellite, to a processor, etc.). In some embodiments, a communication element transmits images (or data related thereto) collected from the camera. In some embodiments, a communication element receives data, information, signals, and/or images, from a processor, satellite, another user, and/or a service provider. In some embodiments, a communication element transmits and/or receives communication via Bluetooth, WI-Fi, cellular, 3G, 4G, etc.

In certain embodiments, the systems and devices of the present invention allow an image of a user's face to be projected into a video game (e.g., to serve as a true-life avatar in a video game). In particular embodiments, the devices and systems are linked to a video game (e.g., similar to XBOX KINNECTS) such that the camera captures an image of the user wearing the device and projects this as the face of the video game character in the game that is being played by the user. In some embodiments, the image of the user's face is enhanced, such as to make it consistent with the video game (e.g., warrior paint, older, younger, etc.) or to make the image of the face objectively better looking In certain embodiments, the systems and devices further comprise a communication element, wherein said communication element is configured to wirelessly transmit images of said user and/or receive data from a video game console or gaming computer (e.g., XBOX, WII, PLAYSTATION, etc.). In particular embodiments, the video game console or gaming computer processes the images captured by the camera and processes them as the face of the character in the video game.

DESCRIPTION OF THE FIGURES

FIG. 6 shows an exemplary embodiment of a face-capturing device or system of the present invention. This figure shows left frame arm (81) and right frame arm (82), where the right frame arm includes a speaker (150) for projecting sound into a user's ear (e.g., from a video conference). This figure also shows how the housing component can be hingedly attached to the main rod such that the camera can pivot out.

FIG. 7 shows the circled area from FIG. 6 and specifically shows a camera casing recess (120) that allows the camera (40) to move from a position in the casing recess to a position outside the recess that points back towards the user's face.

FIG. 8 shows the face-capturing device of FIG. 6 where the main rod (10) is folded back into the main rod recess (30) such that it is flush with the head-mounted frame component (80). The housing component, housing the camera, is folded back into the camera casing recess (120) such that the camera (40) looks outward from the user's face (e.g., so the camera can be used to capture what the user is seeing, rather than capturing an image of the user's face).

FIG. 9 shows an embodiment of the face-capturing device or system of the present invention where the main rod (10) contains a telescoping internal rod (60) that can slide out of the main rod, thus extending the distance of the housing component (containing the camera) from the user's face.

DESCRIPTION OF THE INVENTION

The present invention provides head-mounted systems and devices for capturing an image of a user's face. In particular, the present invention provides systems and devices comprising: a) a head-mounted frame component configured to be mounted on the head of a user (e.g., hat, head band, glasses, goggles, etc.) and b) an extending component that is moveable between a first position in or adjacent to the head-mounted frame component and a second position non-adjacent to the head-mounted frame component that allows a camera on the extending component to capture an image (e.g., picture or video) of the user's face.

Figure 1:
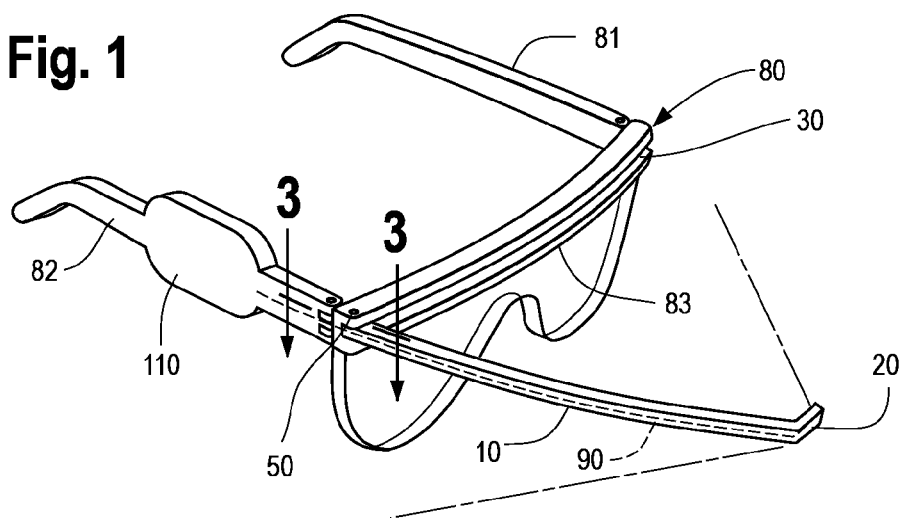
FIG. 1 shows an exemplary embodiment of a face-capturing device or system of the present invention, including a head-mounted frame component (80) and an extending component composed of a main rod (10), housing component (20) and camera (40, not shown) that is attached by a hinge (50) to the head mounted frame component (80). Also shown is a main rod recess (30) that can house the main rod (10) when it is in the "closed" position.

FIG. 1 shows an exemplary embodiment of a face-capturing device or system of the present invention, including a head-mounted frame component (80) (e.g., that includes a lens frame (83) that holds lenses for glasses or goggles) and an extending component composed of a main rod (10), housing component (20) and camera (40, not shown, as it is looking back at the user) that is attached by a hinge (50) to the head mounted frame component (80). Also shown is a main rod recess (30) that can house the main rod (10) when it is in the "closed" position. The main rod is configured to pivot (e.g., on the hinge) so that it can be folded back adjacent to the head-mounted frame component, or within the recess (30) in the head-mounted frame component. The main rod (10) can then extend outward to a point that is away from the head-mounted frame component (and therefore away from a user's face who is wearing the device or system). In the extended position, the camera that is in the housing component (20) can capture a picture or video of the user's face. Preferably, the head-mounted frame component is attached to a left frame arm (81) (that goes over a user's left ear) and a right frame arm (82) (that goes over the user's right ear), in order to secure the device to a user's head. In certain embodiments, the right frame arm contains a frame arm compartment (110) that can be used, for example, to hold batteries, Bluetooth electronics, a CPU, wiring for the camera and other components, etc.). Also shown in FIG. 1 is a wire (90) that runs from the camera (e.g., web cam), or from light, or from microphone, back toward the head-mounted frame component (e.g., to attach to a CPU, or batteries, or Bluetooth connection, etc.). Attaching or including components such as microphones, CPUs, batteries, etc. to glasses or goggles is known in the art. For example TRISPECS glasses incorporate many of these features (see, e.g., U.S. Pat. Pub. 2010/0045928, which is herein incorporated by reference in its entirety).

In some embodiments, the camera (40) is too close to the user's face such that a distorted facial image is generated. In some embodiments, the distortion of the facial image is corrected by optical (e.g., lens) and/or digital (e.g., facial image software) means. In such embodiments, the facial image software (e.g., by a CPU in the device or hosted in the internet) is used to correct the facial image prior to sending to another party. Distortion correction software is well known in the art (see, e.g., Biwasaka et al., Forensic Science International, 197 (1):97-104, 2010; and Biwasaka et al., "Assessment of Computerized Method for Correction of Optical Distortion of Facial Images," Japanese Journal of Forensic Science and Technology Vol. 13 (2008), No. 1 pp. 7-16, both of which are herein incorporated by reference). In some embodiments, software from ALTOSTORM SOFTWARE or IMMERVISION is employed, although any type of suitable commercial software can be employed.

Figure 2:
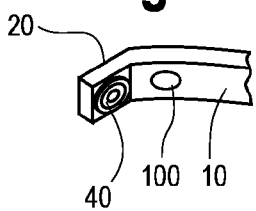
FIG. 2 shows an exemplary embodiment of the housing component (20) attached to the end of main rod (10), where the camera (40) is located in the housing component (20). Also shown is part (100) which may be a light or a microphone.

FIG. 2 shows an exemplary embodiment of the housing component (20) attached to the end of main rod (10), where the camera (40) is located in the housing component (20). It is noted that, in some embodiments, part (40) is instead a mirror (or other optical device) that reflects the image of the user's face back to a camera that is located on the frame component (80), where the camera is focused on the mirror (or other optical component). In such embodiments, the distance from the frame mounted camera to the mirror and back to the user's face allows a wider view of the user's face given the distance that the image has to travel.

Also shown in FIG. 2 is part (100) which may be a light, microphone, or other sensor (e.g., temperature sensor, gyroscope, etc.). In certain embodiments, the camera is a wide-angle camera or a web-cam, or a wide-angle web cam. In certain embodiments, part (100) is a microphone configured to pick up the voice of the user (e.g., when the user is making a phone call or video call). In particular embodiments, part (100) is a light (visible light or infrared light) that is used to illuminate the user's face such that it can be clearly picked up by the camera (e.g., for a video conference).

Figure 3:
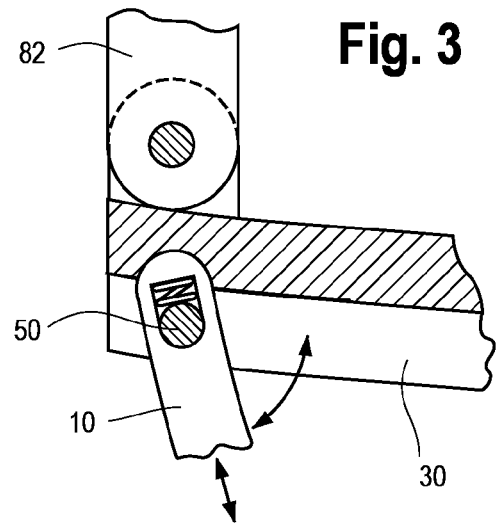
FIG. 3 shows a cross-section through 3-3 in FIG. 1, and shows how the main rod (10) can pivot on the hinge (50).
Figure 4:
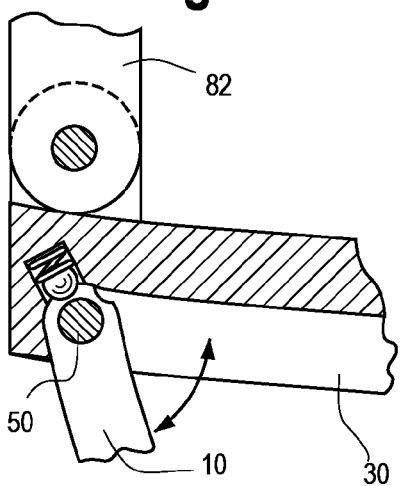
FIG. 4 shows a cross-section through 3-3 in FIG. 1, and shows how the main rod (10) can pivot on the hinge (50), where the hinge is different from that shown in FIG. 3.
Figure 5:
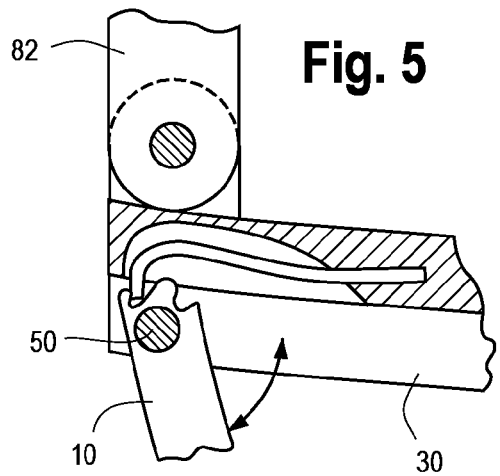
FIG. 5 shows a cross-section through 3-3 in FIG. 1, and shows how the main rod (10) can pivot on the hinge (50), where the hinge is different from that shown in FIGS. 3 and 4.

FIGS. 3, 4, and 5 show a cross-section through 3-3 in FIG. 1, and show how the main rod (10) can pivot on the hinge (50), where the hinge can be any type of suitable hinge, such as those shown in these figures.

FIG. 6 shows an exemplary embodiment of a face-capturing device or system of the present invention. This figure shows left frame arm (81) and right frame arm (82), where the right frame arm includes a speaker (150) for projecting sound into a user's ear (e.g., from a video conference). The speaker (150) can be flush (as shown) or can bulge out such that the speaker is physically aimed at the user's ear. This figure also shows how the housing component can be hingedly attached to the main rod such that the camera can pivot out. Also shown in the left frame arm is a unidirectional speaker (160) that is aimed toward the user's mouth such that it can pick up the user's voice during phone calls or video calls, while largely excluding ambient sound.

FIG. 7 shows the circled area from FIG. 6 and specifically shows a camera casing recess (120) with a hinge (70) that allows the camera (40) to move from a position in the casing recess to a position outside the recess that points back towards the user's face. In such embodiments, as can be seen in FIG. 7, pivoting of the camera casing (and therefore the camera) allows a single camera to both capture a user's face (when extended and pivoted back towards the user's face) and to capture what the user is seeing (when the main rod is adjacent to the head-mounted frame component). In some embodiments, a pivoting camera eliminates the need to have two cameras, as one camera, by pivoting and being tucked into a recess, can serve both functions.

FIG. 8 shows the face-capturing device of FIG. 6 where the main rod (10) is folded back into the main rod recess (30) such that it is flush with the head-mounted frame component (80). The housing component (20), housing the camera (40), is folded back into the camera casing recess (120) such that the camera and casing are flush with the front of the frame and the camera (40) looks outward from the user's face (e.g., so the camera can be used to capture what the user is seeing). FIG. 8 also shows an external microphone (130) for capturing audio (e.g., when the camera is being used to capture what the user is seeing).

FIG. 9 shows an embodiment of the face-capturing device or system of the present invention where the main rod (10)

contains a telescoping internal rod (60) that can slide out of the main rod, thus extending the distance of the housing component (containing the camera) from the user's face (e.g., extending the distance from 4-6 inches to 6-10 inches away from the user's face). In such embodiments, the need for facial distortion software correction of a facial image of the user may be less or non-existent as the camera is farther away from the user's face making the likelihood of distortion less.

Figure 10:
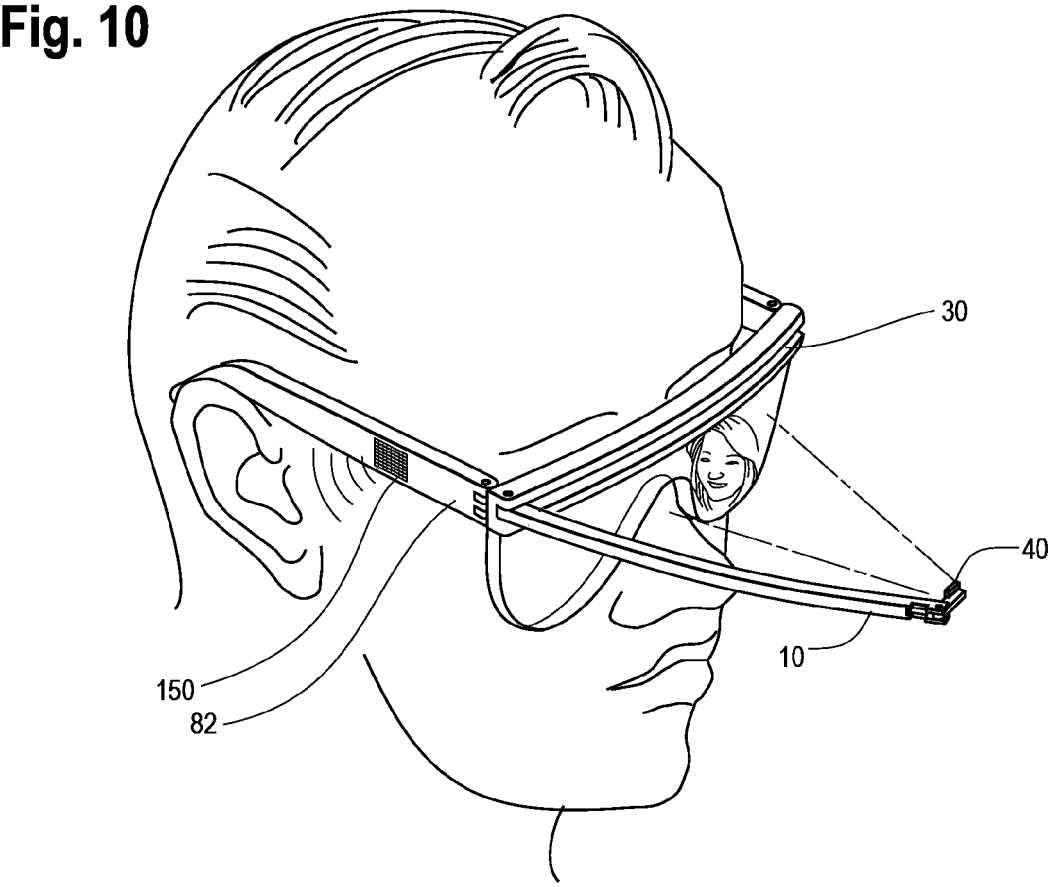
FIG. 10 shows an exemplary embodiment of a face-capturing device or system of the present invention on the head of a user. The camera (40) captures an image of a user's face, which can then be transmitted (e.g., over the internet or cellular network) to another person (e.g., for a video conference). In this embodiment, the face of the other person is projected onto or into one of the lens shown for a true face to face video conference.

FIG. 10 shows an exemplary embodiment of a face-capturing device or system of the present invention mounted on the head of a user. The camera (40) captures an image of a user's face, which can then be transmitted (e.g., over the internet or cellular network) to another person (e.g., for a video conference), to a service provider, and/or to a processor. In this embodiment, the face of the other person is projected onto or into one of the lens shown for a true face to face video conference. Systems and methods for projecting an image (e.g., a person's face or internet site, or user's email, or over-lay maps, etc.) are known in the art. For example, LUMUS Ltd. (Rehovot, Israel) provides a technology where a digital image is projected into the lens of glasses. A description of this technology is provided, for example, in U.S. Pat. Pub. 2005/0180687; U.S. Pat. Pub. 2009/0153437; and U.S. Pat. Pub. 2010/0202048; all of which are herein incorporated by reference in their entireties as if fully set forth herein). In certain embodiments, the devices incorporate this technology or similar technology to allow a user wearing the devices of the present invention to see digital images, such as a person they are on a call with, web pages, email, maps, video games (e.g., incorporating the user's image (e.g., real-time image)), or other digital content.

Figure 11:
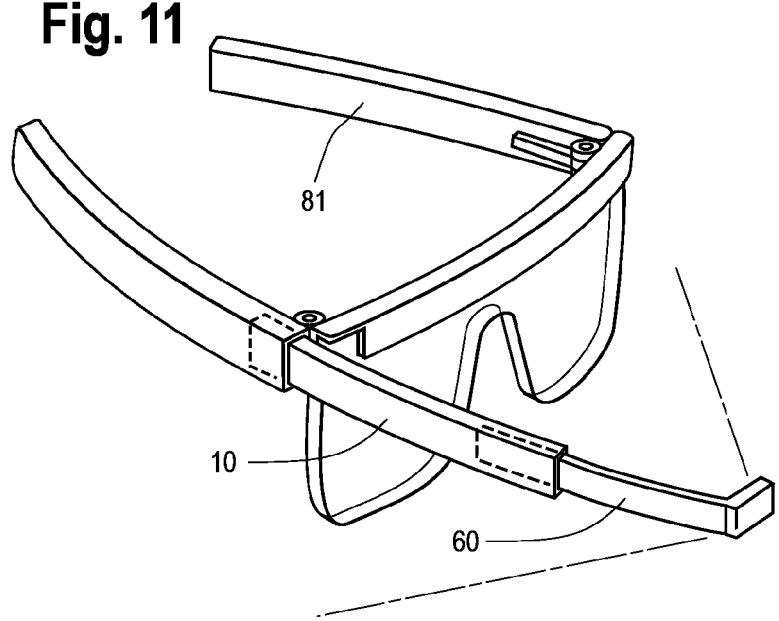
FIG. 11 shows an exemplary embodiment of a face-capturing device or system of the present invention where the main rod (10) is moveable from a position mostly within the right frame arm to a position where it is mostly outside of the right frame arm.

FIG. 11 shows an exemplary embodiment of a face-capturing device or system of the present invention where the main rod (10) is moveable from a position mostly within the right frame arm to a position where it is mostly outside of the right frame arm.

Figure 12:
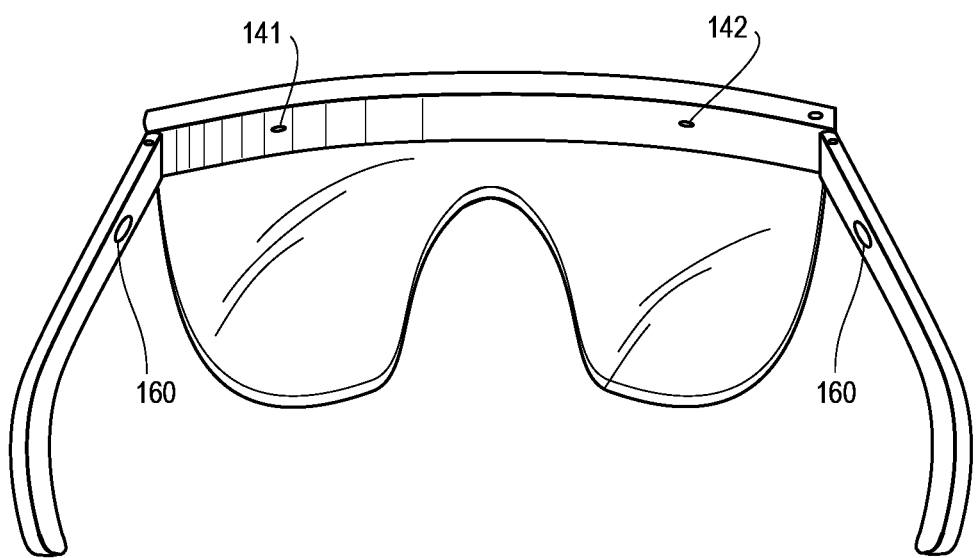
FIG. 12 shows an exemplary embodiment of a face-capturing device or system of the present invention where unidirectional microphones (160) are shown in the frame arms, and left (141) and right (142) eye tracking devices are shown in the head-mounted frame component.

FIG. 12 shows an exemplary embodiment of a face-capturing device or system of the present invention where unidirectional microphones (160) are shown in the frame arms and left (141) and right (142) eye tracking devices are shown in the head-mounted frame component. Eye-tracking (e.g., infrared eye-tracking) devices are well known in the art and can be used to control functions, such as a cursor or mouse. For example, a user may have images of a web page projected onto or into one or both of their lenses. They can then use eye tracking to control a mouse or cursor or device that monitors gaze time (and/or blinks) to control interaction with a computer, such as a web page or email, or other computer format. Eye tracking devices and "eye mice" are described in the following publications: "Eye Tracking Methodology: Theory and Practice," by Andrew T. Duchowski, 2003; devices from TOBII Technology (Sweden); KOPIN's "GOLDEN-I"; U.S. Pat. Pub. 2007/0164990 "Arrangement, Method and Computer Program for Controlling a Computer Apparatus Based on Eye-Tracking;" U.S. Pat. Pub. 2009/0125849 "Eye Tracker with Visual Feedback;" U.S. Pat. No. 6,637,883 "Gaze Tracking System and Method;" Krolak and Strumillo, "Eye-blink Controlled Human-Computer Interface for the Disabled," Human-Computer Sys. Intera., AISC 60, pgs 123-133, 2009; all of which are herein incorporated by reference as if fully set forth herein.

All publications and patents mentioned in the present application are herein incorporated by reference. Various modification and variation of the described methods and compositions of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

We claim:

1. A device for capturing an image of a user's face comprising:
   a) a head-mounted frame component configured to be mounted on the head of a user; and
   b) an extending component connected to said head-mounted frame component,
   wherein said extending component comprises;
      i) a main rod,
      ii) a housing component attached to said main rod,
      iii) a camera located in or attached to said housing component;
   wherein said extending component is moveable between:
      a first position in or adjacent to said head-mounted frame component, wherein said first position allows said camera to capture what said user is seeing, and
      a second position non-adjacent to said head-mounted frame component, wherein said second position allows said camera to capture an image of said user's face when said head-mounted frame component is attached to said head of said user.

2. The device of claim 1, further comprising a housing component hinge, wherein said housing component is attached to said main rod via said housing component hinge.

3. The device of claim 2, wherein said main rod comprises a camera casing recess configured to allow said housing component and camera to pivot therein via said housing component hinge.

4. The device of claim 1, further comprising at least one lens, wherein said at least one lens is attached to said head-mounted frame component, and is configured to at least partially cover said user's eye when said device is mounted on said user's head.

5. The device of claim 1, further comprising a projection device configured to project an image onto or into said at least one lens such that it can be seen by said user.

6. The device of claim 1, wherein said second position places said camera at least 4 inches away from said user's face.

7. The device of claim 1, wherein said extending component is hingedly connected to said head-mounted frame component.

8. The device of claim 1, further comprising at least one eye tracking device configured to track eye movement and/or blinks.

9. The device of claim 1, further comprising a communication element, wherein said communication element is configured to wirelessly transmit images of said user and/or receive data from an outside source.

10. The device of claim 9, wherein said communication element is configured to transmit and receive data from a video game console or gaming computer.

11. The device of claim 1, wherein said head-mounted frame component comprises a left frame arm and a right frame arm, and wherein said left or said right frame arm comprises a speaker configured to direct sound to said user's ear.

12. The device of claim 1, further comprising a light or microphone located on said main rod adjacent to said camera.

13. The device of claim 1, wherein said camera comprises a wide-angle lens.

14. The device of claim 1, wherein said camera comprises a web-cam.

15. The device of claim 1, wherein said head-mounted frame component comprises a main rod frame recess.

16. The device of claim 15, wherein said first position is within said main rod frame recess.

17. The device of claim 1, further comprising a telescoping internal rod that is configured to extend from within said main rod.

18. A system for capturing an image of a user's face comprising:
   a) a head-mounted frame component configured to be mounted on the head of a user; and
   b) an extending component connected to said head-mounted frame component,
   wherein said extending component comprises;
      i) a main rod,
      ii) a housing component attached to said main rod,
      iii) a camera located in or attached to said housing component;
   wherein said extending component is moveable between:
      a first position in or adjacent to said head-mounted frame component, wherein said first position allows said camera to capture what said user is seeing, and
      a second position non-adjacent to said head-mounted frame component, wherein said second position allows said camera to capture an image of said user's face when said head-mounted frame component is attached to said head of said user.

* * * * *